May 29, 1928.　　　　　　　　　　　　　　　　1,671,497
W. E. TRUMPLER
REDUCTION GEAR MECHANISM
Filed Dec. 7, 1923
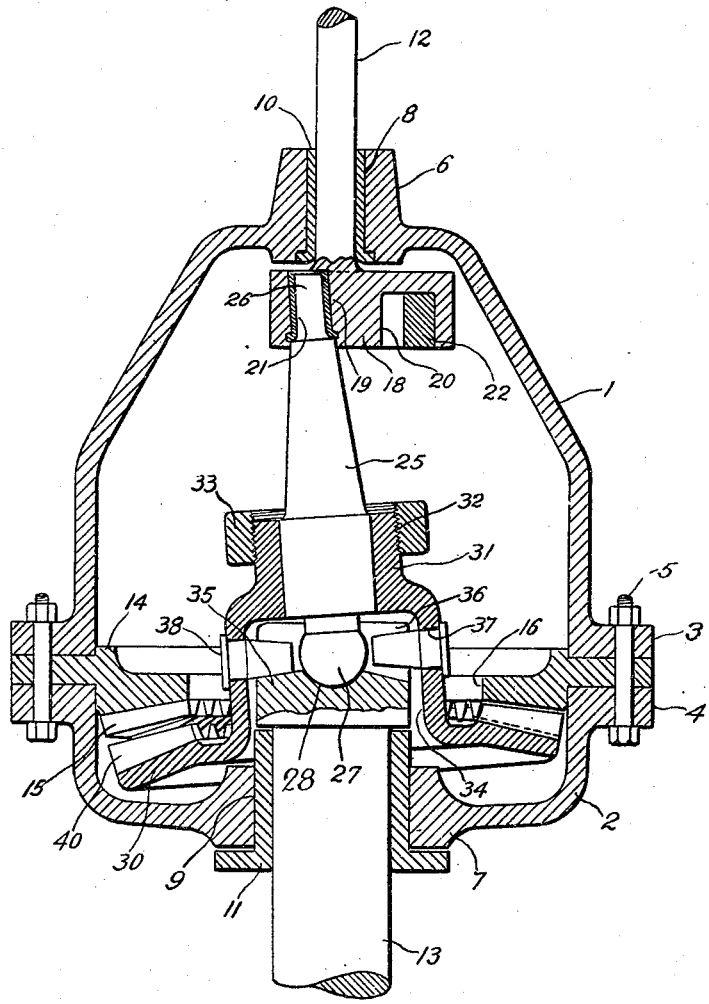
WITNESSES:
INVENTOR
William E. Trumpler
BY
ATTORNEY Patented May 29, 1928.

1,671,497

UNITED STATES PATENT OFFICE.

WILLIAM E. TRUMPLER, OF WILKINSBURG, PENNSYLVANIA, ASSIGNOR TO WESTINGHOUSE ELECTRIC & MANUFACTURING COMPANY, A CORPORATION OF PENNSYLVANIA.

REDUCTION-GEAR MECHANISM.

Application filed December 7, 1923. Serial No. 679,067.

My invention relates to gear reduction mechanisms, more particularly to gear reduction units comprising mechanical movements of a minimum number of parts which are capable of transmitting rotary motion and power at a very great gear ratio to obtain relatively high or exceedingly low speeds on the respective driving or driven spindles.

It is among the objects of my invention to provide a mechanical movement for a reduction gear unit which shall be of simple, compact and durable mechanical construction comprising a minimum number of parts, which shall be designed to minimize the dynamic forces exerted by the rotative and oscillatory parts and which shall be generally of such design and construction as will facilitate its adaptation to various types of uses.

In my copending application, Serial No. 604,501, filed December 2, 1922, reduction gears, I have described a similar mechanism comprising a casing or housing having a pair of shafts in axial alinement journaled for rotation therein and an intermediate oscillatory shaft cooperatively associated with said pair of shafts, said oscillatory shaft having a gear wheel secured at one end thereof for engagement with a stationary gear wheel secured to said housing.

My present invention differs therefrom mainly in that the working faces of the cooperating gear wheels are so disposed as to provide an effective thrust away from the high-speed shaft to the slowly rotating member to increase the efficiency of the drive. This construction also provides an inherent balance of the oscillatory member about its pivot point. Another improvement resides in the type of connection provided between the driven shaft and the oscillatory shaft and I have further improved minor details of the design of the several co-operating parts which I shall more fully describe with the aid of the accompanying drawing, in which like reference characters designate like parts and in which the single figure is a view in section of a gear reduction unit embodying the principles of my invention.

The mechanism illustrated in the drawing comprises a two-part housing 1 and 2 having radially extending flanges 3 and 4, respectively, by which the parts are joined with through bolts 5. The respective ends 6 and 7 of the members 1 and 2 are provided with central openings 8 and 9 adapted to receive bushings 10 and 11 for journalling crank and driven shafts 12 and 13, respectively, which shafts are in axial alinement.

A ring gear 14, having a toothed face 15 extending in the direction of the end 7 of the casing and having a relatively large opening 16, is secured between the flanges 3 and 4 of the housing.

The shaft 12 is provided with a crank 18 which may constitute an integral part thereof, said crank being provided with a cylindrical opening 19 and a recess 20, the opening 19 being bushed with a sleeve 21 and the recess 20 is plugged with a suitable amount of metal 22 to balance the crank and the radial forces exerted by the oscillatory shaft.

An oscillatory shaft 25, having a reduced bearing end 26, is journalled for rotation in the bushing 21 of the crank and its other end 27 is of spherical shape and adapted to seat in a central portion 28 of the end or expanded head 35 of the shaft 13, which is formed complementary to the end 27 of the shaft 25. The axis of the opening 19 in the crank 18 intersects the axis of the shafts 12 and 13 at the center of the spherical end 27 thereby providing for a slight inclination of the shaft 25 relative to the axis of the shafts 12 and 13.

A bevel gear 30, having an extending hub portion 31, is secured to the shaft 25. The hub portion is provided with a threaded end 32 to effect engagement with a concentric balancing ring nut 33 that is adjustably carried by the gear 30 to bring the resultant dynamic force produced by the oscillatory member into the plane of rotation of the crank 18 where this force will be balanced by the counter-weight 22. The center of the gear hub is further provided with a recess 34 to provide ample clearance for the expanded head portion 35 of the shaft 13.

The head 35 is provided with a plurality of radial slots 36 and the hub portion of the gear wheel 30 is provided with openings 37 for securing trunnions 38 that extend radially inwardly and engage the faces of the slots 36 to effect a driving coupling between the gear 30 and shaft 13.

The operation of this reduction unit is briefly as follows: Assuming the shaft 12 to be coupled to a power unit, such as a dynamo-electric machine, or that said shaft is the armature shaft of such a machine, the said shaft, when actuated, will rotate the crank 18 and produce an oscillatory motion of the shaft 25 in the spherically-curved seat 28 of the shaft 13. This movement of the shaft 25 will produce a corresponding motion of the gear wheel 30 causing the gear teeth 40 to successively mesh with the teeth 15 of the ring gear 14, the number of teeth in the respective wheels being such as to obtain a variation of one tooth for a complete revolution of the gear wheel 30. The difference in tooth ratios will differentiate the speeds of the shaft 12 and 13 to the amount of the greatest number of teeth available in either one of the co-operating gear members so that if, for example, the member 14 contains thirty teeth and the wheel 30 twenty-nine teeth, the shaft member 12, in rotating thirty revolutions, would effect a single revolution of the shaft 13 and conversely if the mechanism is actuated through the shaft 13, then, for every revolution thereof, the driven shaft 12 would rotate thirty revolutions.

The disposition of the respective tooth elements of the gear wheels are such as to effect a thrust towards the ball joint 27 away from the crank 18 of the drive mechanism which is inherently the weakest portion of the unit.

The mass of the oscillatory member comprising the gear wheel 30 and the shaft 25 is so distributed that the ends 26 and 27 of the shaft 25 include mutual percussion or oscillation points of a physical pendulum and the distance between the centers of percussion constitutes the length of an equivalent simple or mathematical pendulum. Further, such a pendulum will have the same characteristics when pivoted at either percussion point.

If now we consider the oscillatory member pivoted for universal movement at the percussion point in the end 27 and apply a force to the percussion point in the end 26 to swing it in a circle we find from the pendulum law that there will be no radial force exerted by the percussion point in the end 27 against its support.

The purpose of the balancing ring 33 is to provide means for adjusting the mass of the oscillatory member to exactly locate the centers of percussion at the pivot center of the shaft end 27 and the bearing center of the shaft end 26 and on the axis of the shaft 25. A concentric ring is used for this purpose in order that the dynamic balance of the oscillatory member about its own axis may not be disturbed.

When the proper mass distribution is attained it is evident from the foregoing explanation that the resultant of all the dynamic forces produced by swinging the oscillatory member about its end 27 will be exerted radially against the crank 18. It is then a simple matter to counterbalance this force by applying a suitable counterweight 22 to the crank 18 in its plane of revolution and 180° from the shaft end 26.

Thus, by adjusting the weights 33 and 22 by the cut and try method the entire rotating system may be placed in dynamic or running balance. This condition removes all dynamic forces from the ball and socket thrust bearing comprising the shaft ends 27 and 28, and reduces vibration to a minimum thereby greatly increasing the durability and efficiency of the device.

Another advantage of my reduction gear unit is the compact design of the mechanical movement and the protective housing which further functions as a lubricating chamber, thus adapting this mechanism to relatively high speeds and continuous operation.

It is evident from the description of my invention that my reduction gear unit provides a simple, relatively inexpensive and efficient drive mechanism applicable to a number of applications, such as domestic appliances and industrial drives.

Although I have described a specific embodiment of my invention, it will be obvious to those skilled in the art that various modifications may be made in the details of construction of the design and relative proportions of the several cooperating parts without departing from the principles herein set forth.

I claim as my invention:—

1. A reduction gear system comprising a crank shaft, a driven shaft, a stationary ring gear having its toothed face extending in the direction of the driven shaft, an angularly mounted gear-wheel having a different number of teeth meshing therewith and connected in swinging relation to said crank shaft, means for operatively connecting said angularly mounted gear-wheel with said driven shaft and balancing means for changing the position of the center of gravity of said angularly mounted gear-wheel.

2. In a mechanical movement, the combination with a casing, of a pair of shafts, one of which is provided with a crank, journalled for rotation in axial alinement in said casing, a bevel gear concentrically disposed relative to the axis of said shafts and fixed against rotation in said casing, an oscillatory shaft journalled at one end in said crank and connected for universal movement with said other shaft and a gear wheel mounted on said oscillatory shaft, the toothed face of said fixed gear being disposed to effect a thrust against the end of the shaft opposite to the crank shaft.

3. In a mechanical movement the combination with a pair of shafts in axial alinement, of an intermediate oscillatory shaft, a ring gear concentrically disposed relative to the axis of the first named shafts, a co-operating gear wheel having its hub projecting through said ring gear and secured to said oscillatory shaft, a ring nut adjustably mounted on the projected end of said hub and a spline connection between said oscillatory shaft and one of said first named shafts.

4. In a mechanical movement the combination with a pair of shafts in axial alinement, of an intermediate oscillatory shaft journalled in the crank of one of said shafts and having a spherically-curved seating engagement with the other, a ring gear concentrically disposed relative to the axis of the first named shafts, a co-operating gear wheel having its hub projected through said ring gear and secured to said oscillatory shaft, a ring nut adjustably mounted on the projected end of said hub and a spline connection between said oscillatory shaft and said last-named shaft, the thrust of said gear wheels being against the seat of said last named shaft.

5. A reduction-gear system comprising a crank shaft, a driven shaft, a stationary ring gear having its toothed face extending in the direction of the driven shaft, an angularly mounted gear-wheel having a different number of teeth meshing therewith and connected in swinging relation to said crank shaft and a concentric balancing weight mounted on said last named gear and adjustable along the axis thereof for adjusting the center of gravity of the swinging mass.

6. A reduction-gear system comprising a crank shaft, a driven shaft, a stationary ring gear having its toothed face extending in the direction of the driven shaft, an angularly mounted gear-wheel having a different number of teeth meshing therewith and connected in swinging relation to said crank shaft and balancing means for said angularly mounted gear-wheel comprising a weight adjustable along the axis thereof.

7. A reduction-gear system comprising a crank shaft, a driven shaft, a stationary ring gear having its toothed face extending in the direction of the driven shaft, an angularly mounted gear-wheel having a different number of teeth meshing therewith and connected in swinging relation to said crank shaft, means for shifting the center of gravity of said angularly mounted gear wheel and counterbalancing means for said crank shaft, said means cooperating to dynamically balance the reduction gear system.

8. A reduction-gear system comprising a crank shaft, a driven shaft, a stationary gear wheel, an angularly mounted oscillatory shaft, a gear wheel having a different number of teeth meshing with said stationary gear wheel and mounted on said oscillatory shaft, means for operatively connecting said angularly mounted gear wheel with said driven shaft and means for transmitting the thrust of said gear to the driven shaft.

9. A reduction-gear system comprising a crank shaft, a driven shaft having a spherical seat in the end thereof, an oscillatory shaft having a spherical end for engaging the spherical seat in the driven shaft, and adapted to operatively engage the crank at its other end, a stationary gear wheel mounted concentric with the axis of, and having its toothed face extending in the direction of said driven shaft, a gear wheel having a different number of teeth meshing therewith and mounted on said oscillatory shaft and means for operatively connecting said gear wheel with the driven shaft.

In testimony whereof, I have hereunto subscribed my name this 26th day of November, 1923.

WILLIAM E. TRUMPLER.